US009930037B2

(12) United States Patent
Libonate et al.

(10) Patent No.: US 9,930,037 B2
(45) Date of Patent: *Mar. 27, 2018

(54) ENCRYPTING A UNIQUE IDENTIFICATION HEADER TO CREATE DIFFERENT TRANSACTIONAL IDENTIFIERS

(71) Applicant: Verizon Patent and Licensing Inc., Arlington, VA (US)

(72) Inventors: Brian Libonate, Walnut Creek, CA (US); Praveen Atreya, Jersey City, NJ (US); Thomas W. Haynes, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,776

(22) Filed: Jun. 10, 2015

(65) Prior Publication Data
US 2015/0312255 A1 Oct. 29, 2015

Related U.S. Application Data

(63) Continuation-in-part of application No. 14/480,124, filed on Sep. 8, 2014, now Pat. No. 9,264,430, which
(Continued)

(51) Int. Cl.
*H04L 29/06* (2006.01)
*H04L 12/26* (2006.01)

(52) U.S. Cl.
CPC .......... *H04L 63/0876* (2013.01); *H04L 43/16* (2013.01); *H04L 63/068* (2013.01); *H04L 63/0892* (2013.01); *H04L 63/168* (2013.01)

(58) Field of Classification Search
CPC ............... H04L 63/168; H04L 63/0876; H04L 63/0892; H04L 43/16; H04L 63/068
(Continued)

(56) References Cited

U.S. PATENT DOCUMENTS 6,487,538 B1 11/2002 Gupta et al.
7,366,523 B2 4/2008 Viikari et al.
(Continued)

FOREIGN PATENT DOCUMENTS

WO 2000/067450 11/2000
WO 2000/73876 12/2000
WO 2006/081680 8/2006

OTHER PUBLICATIONS

Complaint for Patent Infringement Case 3:17-cv-0094-JAG, *Bridge and Post, Inc.* v. *Verizon Comm'n, Inc. et al.*, filed Feb. 1, 2017.
(Continued)

*Primary Examiner* — Tu Nguyen

(57) ABSTRACT

A system may receive a content request associated with a user device. The content request may include information that identifies a subscriber associated with the user device and information that identifies a content provider associated with the content request. The system may determine a unique identification header (UIDH), associated with the subscriber, based on the content request. The system may determine randomized information associated with encrypting the UIDH. The system may encrypt the UIDH to create a transactional identifier. The UIDH may be encrypted based on the randomized information and a shared key. The system may insert the transactional identifier and the randomized information in the content request to create a modified content request. The system may provide the modified content request including the transactional identifier and the randomized information.

20 Claims, 9 Drawing Sheets

Related U.S. Application Data is a continuation of application No. 13/477,539, filed on May 22, 2012, now Pat. No. 8,832,436.

(58) Field of Classification Search
USPC .......................................................... 713/168
See application file for complete search history.

(56) References Cited

U.S. PATENT DOCUMENTS

| | | |
|---|---|---|
| 7,657,594 B2 | 2/2010 | Banga et al. |
| 8,601,090 B1 * | 12/2013 | Richardson ............. H04L 29/00 709/217 |
| 8,832,436 B2 | 9/2014 | Libonate et al. |
| 8,862,747 B2 | 10/2014 | Shah et al. |
| 2001/0020242 A1 | 9/2001 | Gupta et al. |
| 2005/0172154 A1 | 8/2005 | Short et al. |
| 2005/0259824 A1 * | 11/2005 | Isozaki ................. H04L 63/061 380/255 |
| 2007/0061575 A1 | 3/2007 | Bennett |
| 2008/0222613 A1 | 9/2008 | Allen et al. |
| 2012/0151077 A1 | 6/2012 | Finster |
| 2012/0170740 A1 * | 7/2012 | Lee ....................... H04L 9/0618 380/44 |
| 2012/0173379 A1 | 7/2012 | Soroca et al. |

OTHER PUBLICATIONS

"Microsoft Product Activation for Windows XP", Technical Details on Microsoft Product Activation for Windows XP, 8 pages, Aug. 2001.

* cited by examiner

| Message Type 555 | User Agent 560 |
|---|---|
| Destination Address 565 | Transactional Identifier 570 |
| Randomized Information 572 | Port Range 520 |
| Public IP Address 525 | Session Time 530 |

| User Device 505 | Subscriber Information 510 |
|---|---|
| Internal IP Address 515 | Port Range 520 |
| Public IP Address 525 | Session Time 530 |

ENCRYPTING A UNIQUE IDENTIFICATION HEADER TO CREATE DIFFERENT TRANSACTIONAL IDENTIFIERS

RELATED APPLICATION

This application is a Continuation-In-Part (CIP) of U.S. patent application Ser. No. 14/480,124, filed on Sep. 8, 2014, which is a continuation of U.S. patent application Ser. No. 13/477,539, filed May 22, 2012 (now U.S. Pat. No. 8,832, 436), the contents of which are incorporated by reference herein in their entirety.

BACKGROUND

A service provider network may transport network traffic associated with a variety of services, applications, and content. The service provider network may transport traffic between user devices and content providers to enable the services, the applications, and the content to be transported by the content providers and/or received by user devices. In some cases, the content providers may provide services, applications, and/or content that are targeted to a subscriber, associated with a user device, based on a unique identifier associated with the subscriber, such as a unique identification header (UIDH).

BRIEF DESCRIPTION OF THE DRAWINGS

FIGS. 5A and 5B are diagrams of example data structures that store information associated with a network address translation (NAT) operation and/or a request that includes a unique identification header (UIDH), respectively;

DETAILED DESCRIPTION OF PREFERRED EMBODIMENTS

The following detailed description of example implementations refers to the accompanying drawings. The same reference numbers in different drawings may identify the same or similar elements.

A user device may provide a request to a content provider, such as a request associated with obtaining content from the content provider. In some cases, a content distribution system (CDS) may be capable of receiving the request, determining a subscriber identifier included in the request and associated with the user device, generating a unique identifier (e.g., a unique identification header (UIDH)) based on encoding the subscriber identifier, and modifying the request to include the UIDH before providing the modified request to the content provider. Use of the UIDH may allow the user device to be provided with targeted content (e.g., content tailored to the subscriber) without the subscriber identifier and/or other information associated with the subscriber (e.g., account information, personal information, private information, etc.) being provided or accessed by to the content provider.

However, in a case where the UIDH is generated by encoding the subscriber identifier using a deterministic function (e.g., when the UIDH is generated by encoding the subscriber identifier using a one-way hash function) and inserted into multiple requests provided by the user device, the content provider may use the UIDH to determine information associated with the subscriber. For example, the content provider may identify a correlation between a request including the UIDH and a login associated with a subscriber account for the content provider, which may allow the content provider to identify the subscriber and/or track subscriber activity associated with the content provider. Moreover, even if the user device deletes information associated with activity related to the content provider (e.g., by deleting cookies stored by the user device), the content provider may be capable of re-establishing the information associated with the subscriber activity due to the inclusion of the UIDH in subsequent modified requests provided to the content provider. In other words, an unchanging UIDH included in multiple requests may be exploited to act as a "super-cookie" that the content provider may use to identify the subscriber, track subscriber activity, or the like.

Implementations described herein may allow a content distribution system to create multiple, different transactional identifiers based on encrypting a UIDH, associated with a subscriber, and insert the multiple transactional identifiers into multiple corresponding requests associated with a content provider. This may prevent the content provider from identifying the subscriber and/or tracking subscriber activity based on the UIDH, while still allowing targeted content to be provided to the user device associated with the subscriber.

Figure 1:
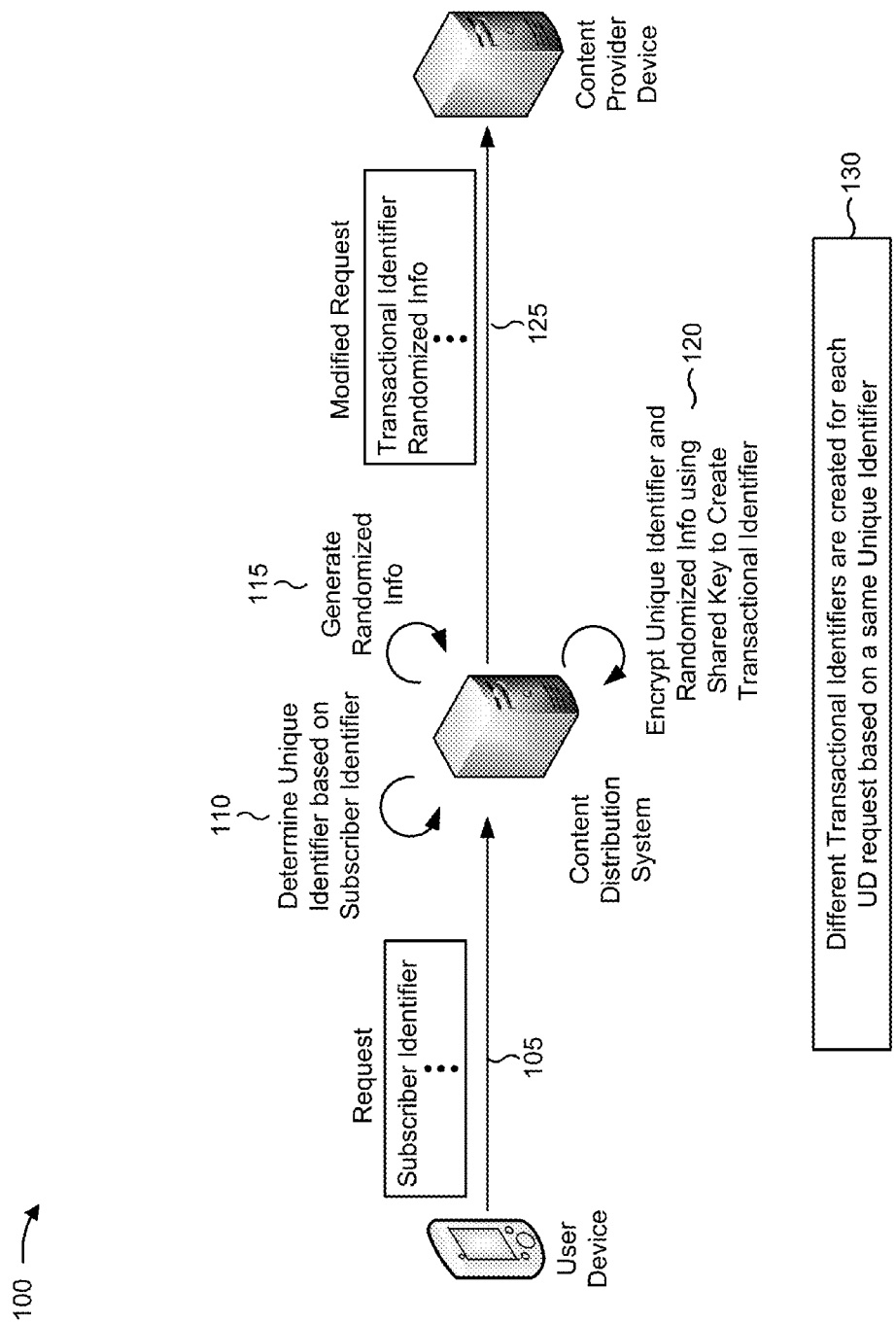
FIG. 1 is a diagram of an overview of an example implementation described herein.

FIG. 1 is a diagram of an overview of an example implementation 100 described herein. As shown in FIG. 1, and by reference number 105, a user device may provide a request (e.g., a content request, a request associated with identifying a subscriber associated with the user device, a request associated with mobile commerce in which the subscriber wishes to participate, a request associated with a fraud prevention and/or protection service, etc.) to a content distribution system positioned between the user device and a content provider device to which the request is directed. As shown, the request may include a subscriber identifier associated with the subscriber, such as a mobile directory number (MDN), a landline director number (LDN), a subscriber identity module (SIM) uniform resource identifier (URI), a mobile identification number (MIN), an international mobile subscriber identity (IMSI), a mobile subscriber integrated services digital network (MSISDN) identifier, a national access identifier (NAI), or the like. As shown, the request may also include information associated with the content provider device, such as a uniform resource locator (URL), a web address, a network address, or the like. For the purposes of example implementation 100, assume that the content distribution system is configured to insert a transactional identifier in each request received by the content distribution system.

As shown by reference number 110, after receiving the request, the content distribution system may determine (e.g., based on information stored or accessible by the content distribution system) a unique identifier associated with the subscriber, such as a UIDH. As further shown, the content distribution system may also determine a shared key with which the unique identifier is to be encrypted to create the transactional identifier associated with the request.

As shown by reference number 115, the content distribution system may also generate randomized information associated with encrypting the unique identifier, such as a random number, a random value, a nonce, or the like. As shown by reference number 120, the content distribution system may combine the unique identifier and the randomized information (e.g., by adding the randomized information to the end of the unique identifier, to the beginning of the unique identifier, in the middle of the unique identifier, etc.), and may encrypt the combination using the shared key. As shown, the encrypted combination of the unique identifier and the randomized information may be the transactional identifier. As shown by reference number 125, the content distribution system may insert the transactional identifier and the randomized information in the request to create a modified request, and may provide the modified request to the content provider device. As noted by reference number 130, the content distribution system may continue generating different transactional identifiers, associated with the unique identifier, for additional (i.e., subsequent) requests provided by the user device.

In some implementations, the content provider device may receive the modified request, and may provide the transactional identifier and the randomized information to a device associated with an entity that is authorized to access the unique identifier, such as advertising provider device. In this example, the advertising provider device may decrypt the transactional identifier based on the randomized information and the shared key (e.g., stored or accessible by the advertising provider device based on being shared by the content distribution system). The advertising provider device may then provide and/or identify targeted content to be provided to the user device. Here, the content provider device may be unable to decrypt the transactional identifiers (e.g., since the content provider device may not store or may not have access to the shared key), and thus may be prevented from identifying the subscriber and/or tracking subscriber activity based on the unique identifier.

In this way, a content distribution system may create multiple transactional identifiers for a unique identifier associated with a subscriber (e.g., a UIDH), and insert the multiple transactional identifiers into multiple corresponding requests associated with a content provider. As such, the content provider may be prevented from identifying the subscriber and/or tracking subscriber activity based on the unique identifier, while still allowing targeted content to be provided to the user device associated with the subscriber.

Figure 2:
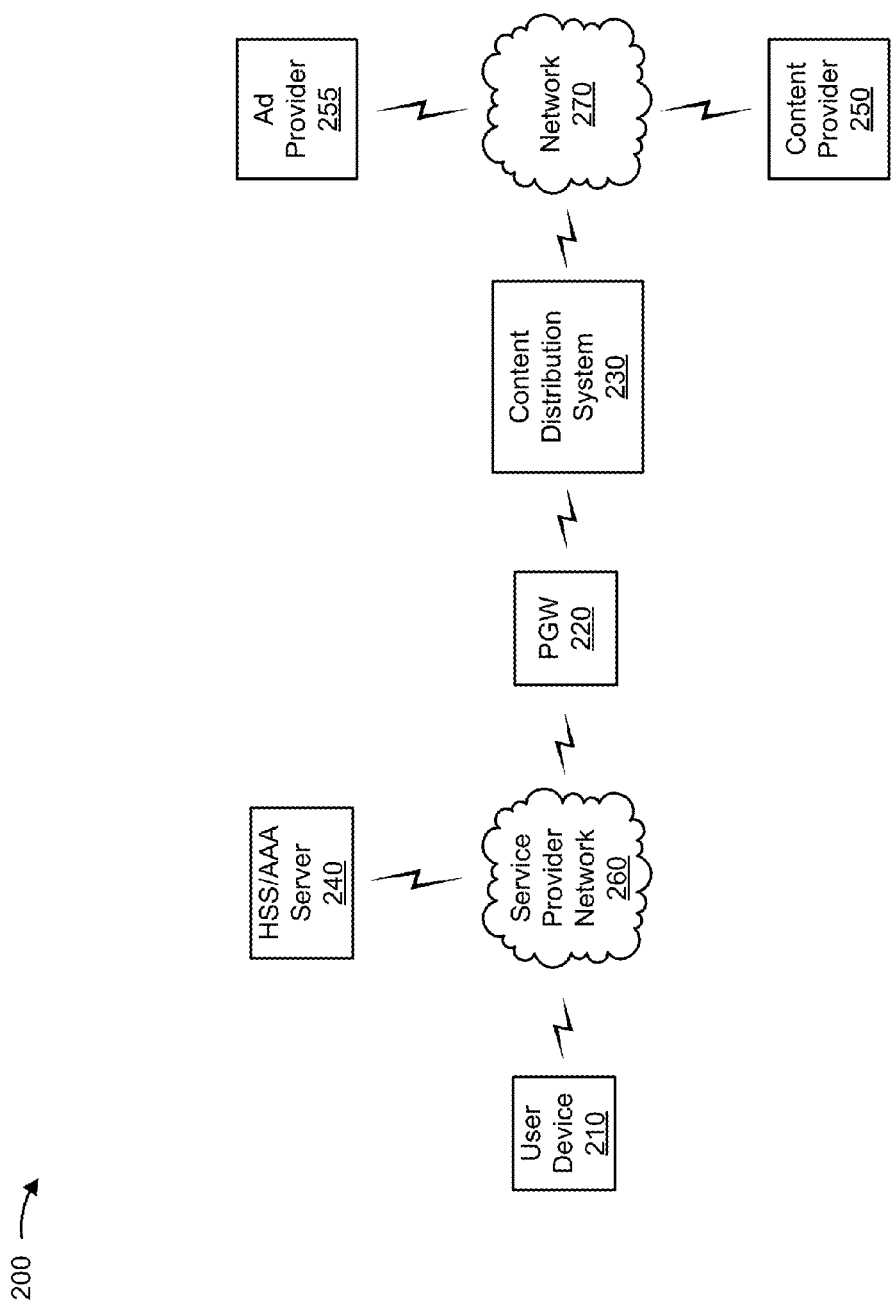
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a packet data network (PDN) gateway (PGW) device 220 (hereinafter referred to as a "PGW 220"), a content distribution system 230 (hereinafter referred to as a "CDS 230"), a home subscriber/authentication, authorization, and accounting server 240 (hereinafter referred to as a "HSS/AAA 240"), a content provider 250, an advertising provider 255 (hereinafter referred to as "ad provider 255"), a service provider network 260, and a network 270.

User device 210 may include any computation and communication device that is capable of communicating via service provider network 260. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, tablet computer, a landline telephone, a set top box (STB), a television, a camera, a personal gaming system, or another type of computation and communication device. The description to follow will generally refer to user device 210 as a wireless mobile communication device. The description is not limited, however, to a wireless mobile communication device and may equally apply to other types of user devices.

PGW 220 may include one or more network devices, or other types of computation and communication devices, that gather, process, search, store, and/or provide information in a manner described herein. For example, PGW 220 may include a gateway, a router, a switch, a firewall, a network interface card (NIC), a hub, a bridge, a proxy server, an optical add-drop multiplexer (OADM), or some other type of device (e.g., a home agent (HA)) that processes and/or transfers traffic (e.g., packets). In one example implementation, PGW 220 may include a device that aggregates traffic received from one or more user devices 210, and sends the aggregated traffic to CDS 230. Alternatively, or additionally, PGW 220 may receive traffic from CDS 230 and may send the traffic toward user device 210. PGW 220 may perform a network address translation (NAT) operation, for user device 210, when a request to communicate with network 270 is received from user device 210. Additionally, or alternatively, PGW 220 may obtain, from the request, information associated with a subscriber of service provider network 260 and may communicate with HSS/AAA 240 to authenticate the subscriber based on the information associated with the subscriber. PGW 220 may generate NAT bindings as a result of the NAT operation and may transmit, as session information, information associated with NAT bindings and/or the information associated with the subscriber.

CDS 230 may include one or more computation and communication devices that gather, process, search, store, and/or provide information in a manner described herein. For example, in some implementations, CDS 230 may encrypt a UIDH based on randomized information (e.g., a random number) and a shared key to create a transactional identifier, and may modify the request by inserting the transactional identifier and/or the randomized information into a packet associated with the request (e.g., into a packet header, trailer, payload, etc.). CDS 230 may transmit the modified request to content provider 250 which may enable targeted content to be provided to user device 210 being used by the subscriber with which the UIDH is associated. Additional details regarding CDS 230 are described in below with respect to FIG. 3.

HSS/AAA 240 may include one or more server devices, or other types of computation and communication devices, that gather, process, search, store, and/or provide information in a manner described herein. For example, HSS/AAA 240 may manage and/or store, in a memory associated with HSS/AAA 240, a subscriber profile of a subscriber associated with user device 210. The subscriber profile may identify services for which the subscriber has subscribed, applications used by the subscriber, a usage history, subscriber preferences, etc. The subscriber profile may also, or alternatively, identify whether the subscriber has authorized (e.g., opt in) or not authorized (e.g., opt out) some or all of the subscriber profile to be used to obtain targeted content. Additionally, or alternatively, HSS/AAA 240 may perform authentication, authorization and accounting (AAA) operations when registering user device 210 with service provider network 260. Additionally, or alternatively, HSS/AAA 240 may authenticate a subscriber, associated with service provider network 260, based on information, associated with the subscriber, received from PGW 220 and/or CDS 230.

Content provider 250 may include one or more server devices, or other types of computation and communication devices, that provide any type or form of content. For example, content provider 250 may provide video, audio, images, advertising content, web pages, text, data, and/or some combination thereof. Additionally, or alternatively, content provider 250 may provide applications and/or services, such as games, scripts, messaging services, banking services, etc. Content provider 250 may communicate with a particular user device 210, being used by a subscriber of service provider network 260, to perform electronic transactions to provide a good and/or service in exchange for payment information from user device 210. Content provider 250 may receive, from ad provider 255, targeted content, such as advertising content, etc., that corresponds to a transactional identifier and may provide, via the particular user device 210, the targeted content and/or other content to the subscriber with which the transactional identifier is associated.

Ad provider 255 may include one or more server devices, or other types of computation and communication devices, that provide advertising content. Ad provider 255 may, for example, maintain targeted content, such as advertising content, etc., that corresponds to UIDHs associated with subscribers. Particular advertising content, corresponding to one or more UIDHs, may, for example, conform to attributes of the subscribers with which the UIDHs are associated. Additionally, or alternatively, ad provider 255 may provide advertising content, to content provider 250, that corresponds to a transactional identifier received from content provider 250. In some implementations, ad provider 255 may store or have access to a shared key that may allow ad provider 255 to decrypt a transactional identifier, as described below. In some implementations, ad provider 255 may provide advertising content based on the UIDHs (e.g., rather than based on information that identifies the subscribers).

Service provider network 260 may include one or more wired and/or wireless networks via which user devices 210 communicate and/or receive content. For example, service provider network 260 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 260 may include a wide area network (WAN), a metropolitan area network (MAN), an ad hoc network, an intranet, a fiber optic-based network, and/or a combination of these or other types of networks.

Network 270 may include one or more wired and/or wireless networks. For example, network 270 may include a cellular network, the PLMN, a 2G network, a 3G network, a 4G network (e.g., a LTE network), a 5G network, and/or another network. Additionally, or alternatively, network 270 may include a WAN, a MAN, a telephone network (e.g., the Public Switched Telephone Network (PSTN)), an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
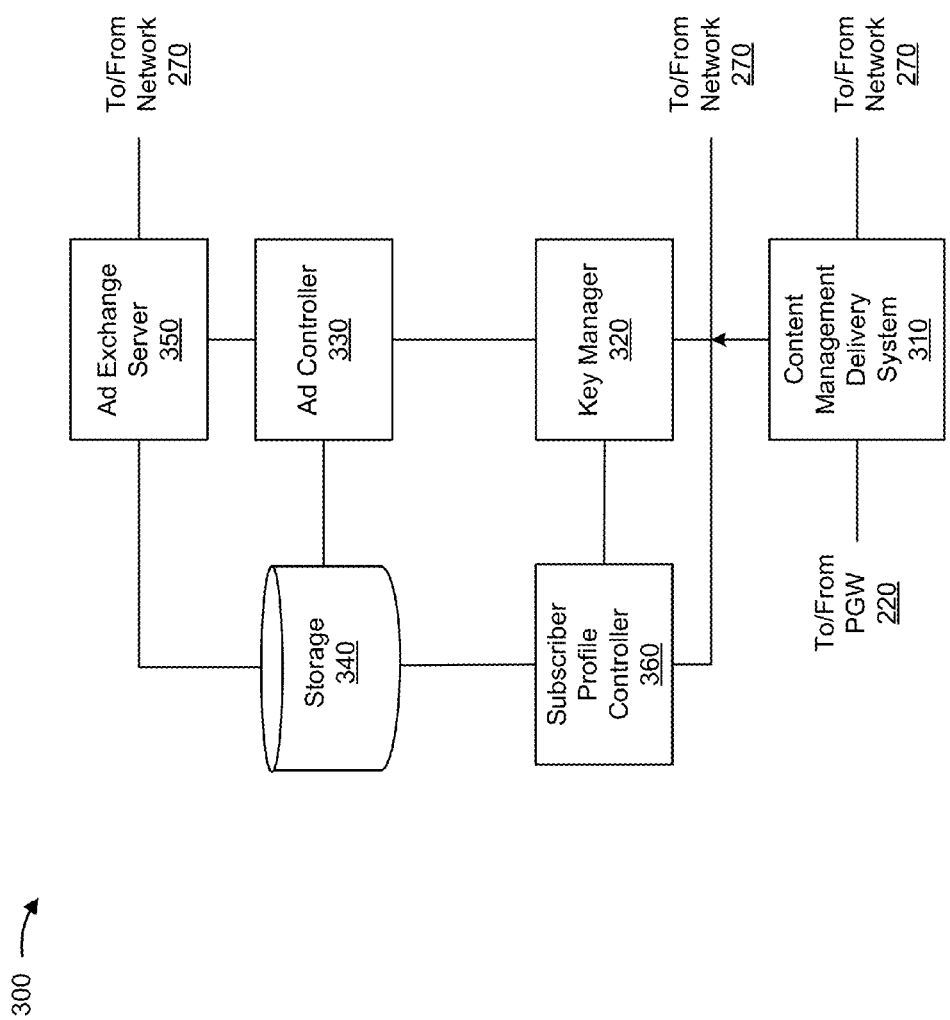
FIG. 3 is a diagram of example components of a content distribution system of the environment in FIG. 2.

FIG. 3 is a diagram of example components of CDS 230. As shown in FIG. 3, CDS 230 may include a collection of components such as a content management delivery system 310 (hereinafter referred to as "CMDS 310"), a key manager 320, an advertising controller 330 (hereinafter referred to as "ad controller 330"), storage 340, an ad exchange server 350, and a subscriber profile controller 360 (hereinafter referred to as "SPC 360").

CMDS 310 may include one or more devices to process requests associated with user devices 210. For example, CMDS 310 may monitor and/or examine flows of packets (e.g., packet headers, trailers, payloads, etc.) received from PGW 220. CMDS 310 may, for example, use deep packet inspection (DPI) techniques and/or some other inspection technique to identify a request for content, received from user device 210, that is destined for content provider 250. As another example, CMDS 310 may identify a request associated with an identity service, received from user device 210, that is destined for content provider 250. Additionally, or alternatively, CMDS 310 may receive session information, from user device 210, that includes information associated with NAT bindings for user device 210 and/or information associated with a subscriber to service provider network 260 that is using user device 210 to obtain the content. In some implementations, CMDS 310 may obtain, from the request or the session information, a subscriber identifier associated with the subscriber (e.g., a mobile directory number (MDN) and/or some other identifier associated with the subscriber).

Additionally, or alternatively, CMDS 310 may use a mechanism to generate the UIDH based on the subscriber identifier. The mechanism may, for example, correspond to a cryptographic hash function and/or some other mathematical function. Additionally, or alternatively, the mechanism may correspond to a one-way cryptographic hash function (e.g., a hash-based message authentication code (HMAC) secure hash algorithm (SHA) HMAC-SHA-256, etc.) and/or some other mathematical function. The UIDH may be valid for a period of time during which the key is valid.

Additionally, or alternatively, CMDS 310 may generate randomized information (e.g., a random number, a random value, a nonce, etc.), may determine a shared key, and may encrypt the UIDH using the randomized information and the shared key to create a transactional identifier. Here, CMDS 310 may insert the transactional identifier and the randomized information into the request to create a modified request. Additionally, or alternatively, CMDS 310 may transmit the modified request to content provider 250. In one example, the request may correspond to a hypertext transfer protocol (HTTP) request and CMDS 310 may insert the transactional identifier and the randomized information into one or more fields within the HTTP request (e.g., in a header, a trailer, a payload, etc.) to create the modified request.

Key manager 320 may include one or more devices that generate a key to be used to generate a UIDH and/or generate or store a shared key associated with encrypting the UIDH. For example, key manager 320 may receive, from CMDS 310, ad controller 330, and/or SPC 360, a request for a key associated with user device 210. The request may, in one example, include the subscriber identifier associated with the subscriber. Additionally, or alternatively, key manager 320 may obtain and/or generate the key that includes a string of alphanumeric characters and/or symbols. Key manager 320 may, for example, generate and/or obtain a random value and may generate the key based on the random value (e.g., using a mechanism, such as a cryptographic hash function and/or some other mathematical function, etc). In one example, a key, may be valid for a period of time (e.g., 1 hour, 12 hours, 1 day, 3 days, 7 days, 14 days, etc.) after which the key is to expire. The period of time may be predetermined by key manager 320 and/or an operator of CDS 230 and/or key manager 320. Key manager 320 may provide the key to CMDS 310, ad provider 255, ad controller 330, and/or SPC 360. Additionally, or alternatively, key manager 320 may provide a notification, to CMDS 310, ad provider 255, ad controller 330, and/or SPC 360, when the key has expired. In one example, key manager 320 may generate the UIDH based on the subscriber identifier (e.g., the MDN, etc.) and/or the key, and may provide the UIDH to CMDS 310.

Additionally, or alternatively, key manager 320 may obtain and/or generate the shared key associated with encrypting the UIDH. In some implementations, the shared key may include a string of alphanumeric characters and/or symbols. Key manager 320 may, for example, generate and/or obtain a random value and may generate the shared key based on the random value (e.g., using a mechanism, such as a cryptographic hash function and/or some other mathematical function, etc). In one example, a shared key may be valid for a period of time (e.g., one month, six months, twelve months, etc.) after which a new shared key may be generated. In some implementations, key manager 320 may provide the shared key with other components of CDS 230 and/or other devices of environment 200. For example, key manager 320 may provide the shared key to a device (e.g., ad provider 255) associated with an entity that is authorized to access the UIDH.

Ad controller 330 may include one or more devices that identify content that can be targeted to the subscriber. For example, ad controller 330 may obtain the transactional identifier, the UIDH, and/or the subscriber identifier and may use the transactional identifier, the UIDH, and/or the subscriber identifier to access HSS/AAA 240 to obtain a subscriber profile associated with the subscriber to service provider network 260. Ad controller 330 may obtain one or more attributes of the subscriber, from the subscriber profile, and may associate the attributes with the UIDH and/or the subscriber identifier. Ad controller 330 may store, in storage 340, the attributes, the UIDH and/or the subscriber identifier.

Additionally, or alternatively, ad controller 330 may identify criteria, associated with content, that identifies attributes, of the subscriber, to which the content is to be targeted (e.g., based on a geographical area, a gender, a genre of content, a language, a usage history, a purchase history, parental controls, etc.). Ad controller 330 may determine whether the attributes, of the subscriber, satisfy the criteria associated with the content. Ad controller 330 may associate, within storage 340, an identifier associated with the content (e.g., a content title, a content name, a content identifier, etc.) with the UIDH and/or the subscriber identifier when the attributes satisfy the criteria.

Storage 340 may include one or more devices that store attributes, subscriber identifiers, UIDHs, information that identifies targeted content associated with the UIDHs, transactional identifiers, randomized information associated with transactional identifiers, and/or shared keys. Additionally, or alternatively, storage 340 may store session information, requests from user devices 210 being used by subscribers, or the like. Additionally, or alternatively, storage 340 may store information associated with a subscriber characteristic and/or a subscriber attribute that may be used to determine a subscriber signal byte string to be included in a transactional identifier, as described below.

Ad exchange server 350 may include one or more devices that process requests, from content provider 250, for targeted content. For example, ad exchange server 350 may receive a request from content provider 250 for targeted content (e.g., targeted advertising content) associated with a transactional identifier included within the request. Ad exchange server 350 may retrieve, from storage 340, a shared key and randomized information associated with the transactional identifier, and may decrypt the transactional identifier to determine the UIDH and/or the subscriber identifier. Ad exchange server 350 may then retrieve information associated with targeted content that corresponds to the UIDH and/or the subscriber identifier. Ad exchange server 350 may provide, to content provider 250, information that identifies from which ad provider 255 the targeted content may be retrieved. Additionally, or alternatively, ad exchange server 350 may instruct ad provider 255 to provide the targeted content to content provider 250. Additionally, or alternatively, ad exchange server 350 may decrypt the transactional identifier to determine a subscriber signal byte string that includes one or more subscriber signals that may be used to identify one or more characteristics and/or attributes associated with the subscriber. By determining the subscriber signal byte string in this manner, a quantity of queries against SPC 360 may be reduced (e.g., since SPC 360 may need not to be queried to determine the characteristics and/or attributes identified by the subscriber byte string). Additional details regarding the subscriber signal byte string are described below.

SPC 360 may include one or more devices that process requests for subscriber authentication services. For example, SPC 360 may register content provider 250, application developers, etc. to receive subscriber authentication services in exchange for a fee and/or other value. SPC 360 may, for example, provide an application programming interface (API) (e.g., an open computing security group (OCSG) API and/or some other API) that enables content providers 250 to communicate with SPC 360 or other components associated with CDS 230.

SPC 360 may receive, from content provider 250, a request to authenticate an attribute associated with a subscriber (e.g., an identity, a MDN, a billing address, payment information, etc.). SPC 360 may obtain a transactional identifier from the request, may retrieve, from storage 340, a shared key and randomized information associated with the transactional identifier, and may decrypt the transactional identifier to determine the UIDH and/or the subscriber identifier. SPC 360 may then determine whether the UIDH is valid (e.g., has not expired, etc.). When the UIDH is valid, SPC 360 may also, or alternatively, perform a look up operation to identify a UIDH, stored within storage 340, that matches the UIDH. SPC 360 may retrieve, from storage 340, an attribute associated with the stored UIDH. SPC 360 may also, or alternatively, determine whether the retrieved attribute matches an attribute obtained from the message. SPC 360 may provide, to content provider 250, a notification that the subscriber is authenticated when the retrieved attribute matches the attribute obtained from the request. SPC 360 may provide, to content provider 250, a notification that the subscriber cannot be authenticated when the retrieved attribute does not match the attribute obtained from the request.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) of CDS 230 may perform one or more functions described as being performed by another set of components of CDS 230.

Figure 4:
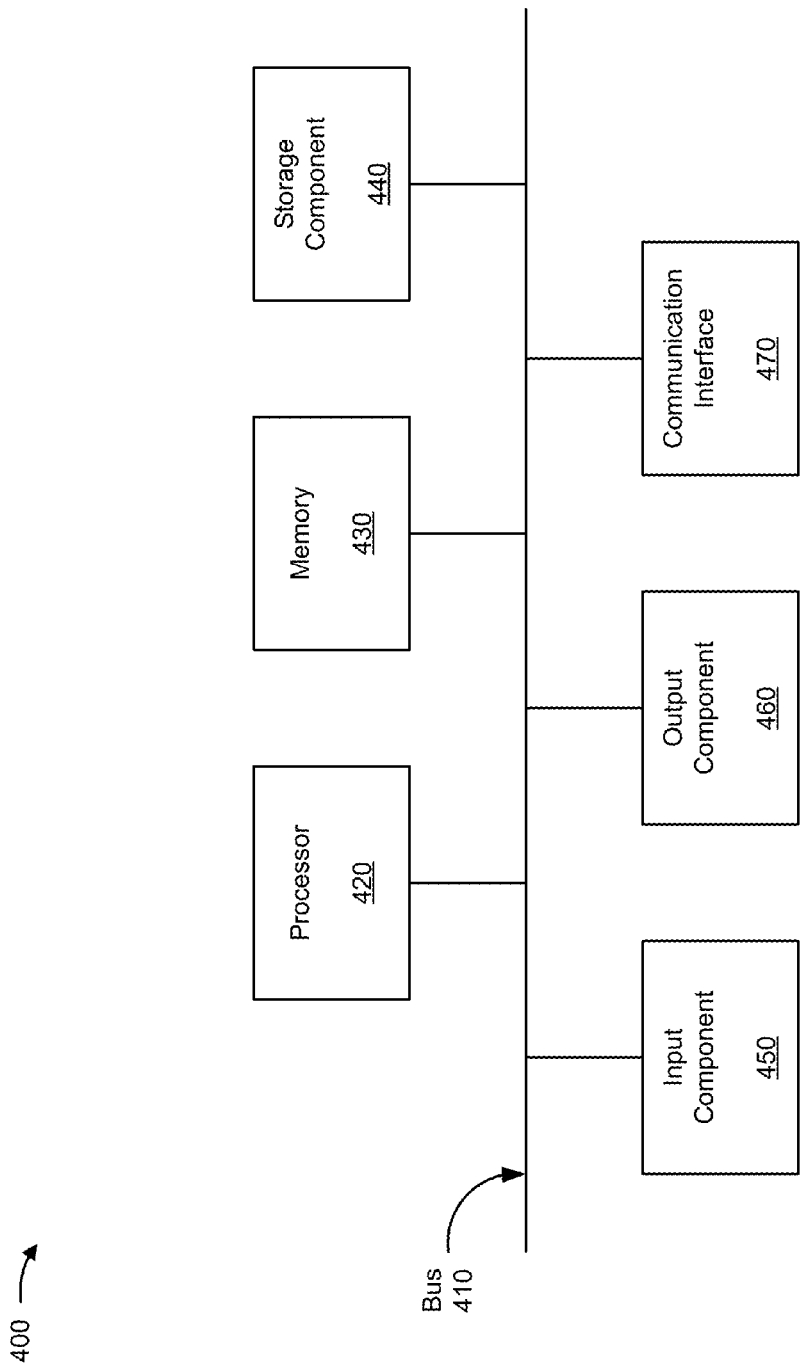
FIG. 4 is a diagram of example components of one or more of the devices of FIG. 2 and/or of the content distribution system of FIG. 3.

FIG. 4 is a diagram of example components of a device 400 that may correspond to user device 210, PGW 220, HSS/AAA 240, content provider 250, ad provider 255, CMDS 310, key manager 320, ad controller 330, ad exchange server 350, and/or SPC 360. Alternatively, each of user device 210, PGW 220, HSS/AAA 240, content provider 250, ad provider 255, CMDS 310, key manager 320, ad controller 330, ad exchange server 350, and/or SPC 360 may include one or more devices 400 or one or more components of device 400. As shown in FIG. 4, device 400 may include a bus 410, one or more processors 420, a memory 430, a storage component 340, an input component 450, an output component 460, and a communication interface 470.

Bus 410 may include a component that permits communication among the components of device 400. Processor 420 is implemented in hardware, firmware, or a combination of hardware and software. Processor 420 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of being programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 340 may store information and/or software related to the operation and use of device 400. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 340. A computer-readable medium is defined herein as a non-transitory memory device. A memory device includes memory space within a single physical storage device or memory space spread across multiple physical storage devices.

Software instructions may be read into memory 430 and/or storage component 340 from another computer-readable medium or from another device via communication interface 470. When executed, software instructions stored in memory 430 and/or storage component 340 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5A is a diagram of an example data structure 500 that stores information associated with a NAT operation. In one example, data structure 500 may be stored in a packet that is provided, by PGW 220, to CDS 230. As shown in FIG. 5A, data structure 500 may include a collection of fields, such as a user device identifier (ID) field 505, a subscriber information field 510, an internal Internet Protocol (IP) address field 515, a port range field 520, a public IP address field 525, and a session time field 530.

User device ID field 505 may store information associated with a particular user device 210. For example, the information associated with the particular user device 210 may include a device identifier (e.g., an international mobile equipment identity (IMEI), an electronic serial number (ESN), a mobile equipment identifier (MEID), etc.), an address (e.g., an Internet protocol (IP) address, a media access control (MAC) address, etc.), etc.

Subscriber information field 510 may store information associated with a subscriber to service provider network 260. The information associated with the subscriber may, for example, include a subscriber identifier (e.g., a MDN, a LDN, a SIM URI, a MIN, an IMSI, a MSISDN identifier, a NAI, etc.) and/or other information associated with the subscriber. The subscriber may use one or more user devices 210 to communicate with service provider network 260. In one example, the subscriber may use the particular user device 210 to communicate with service provider network 260.

Internal IP address field 515 may store an internal IP address associated with the particular user device 210. Port range field 520 may store one or more port identifiers associated with the internal IP address. Public IP address field 525 may store a unique public IP address, associated with the particular user device 210, that corresponds to a private IP address associated with the particular user device 210. Session time field 530 may store information that identifies when information, stored within data structure 500, expires.

Fields 505-530 within data structure 500 are provided for explanatory purposes only. In practice, data structure 500 may include additional fields, fewer fields, different fields, and/or differently arranged fields than are described with respect to data structure 500.

FIG. 5B is a diagram of an example data structure 550 that stores information associated with a request that includes a transactional identifier and randomized information. In one example, data structure 550 may correspond to an HTTP request that is modified, by CDS 230, based on the transactional identifier generated by CDS 230. As shown in FIG. 5B, data structure 550 may include a collection of fields, such as fields 520-530 of FIG. 5A as well as a message type field 555, a user agent field 560, a destination address field 565, a transactional identifier field 570, and a randomized information field 572.

Message type field 555 may store information that identifies a type of message. For example, message type field 555 may store information that indicates that a packet, in which data structure 550 is stored, is associated with a request for content (e.g., an HTTP request). User agent field 560 may store information that identifies a type of user device 210 and/or a browser, executing on the user device 210, from which the request was sent. Destination address field 565 may store information that identifies content provider 250 from which content is being requested. For example, the information that identifies content provider 250, may correspond to a uniform resource locator (URL), or some other network address associated with content provider 250. Transactional identifier field 570 may store a transactional identifier generated based on a UIDH associated with a subscriber to service provider network 260. Randomized information field 572 may include randomized information (e.g., a random number, a random value, a nonce, etc.) used to generate the transactional identifier included in transactional identifier field 570. In some implementations, the request transmitted by user device 210, may be modified, by CDS 230, when a transactional identifier and randomized information are inserted and/or stored in transactional identifier field 570 and randomized information field 572 of data structure 550.

Fields 520-530 and fields 555-572 within data structure 550 are provided for explanatory purposes only. In practice, data structure 550 may include additional fields, fewer fields, different fields, and/or differently arranged fields than are described with respect to data structure 550.

Figure 5C:
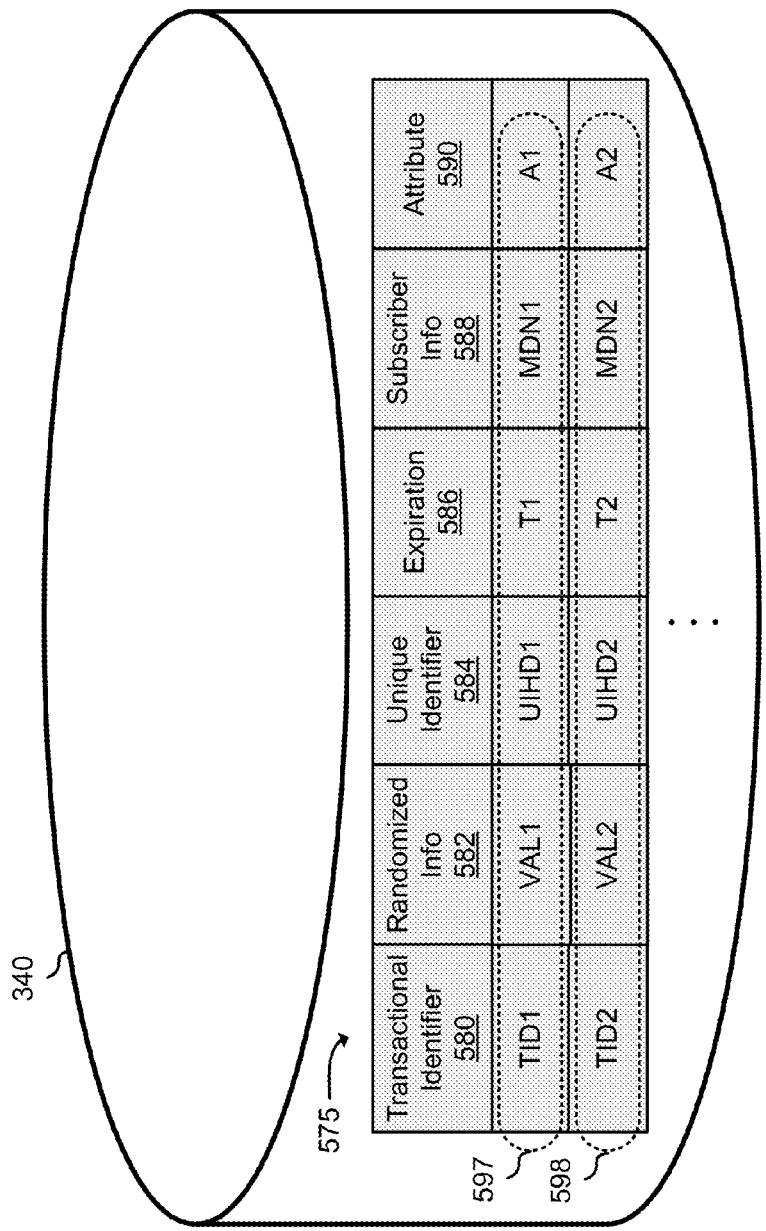
FIG. 5C is a diagram of a data structure that stores information used to provide targeted content and/or an authentication service.

FIG. 5C is a diagram of a data structure 575 that stores information used to provide targeted content and/or an authentication service. In one example, data structure 575 may be stored in storage 340. As shown in FIG. 5C, data structure 575 may include a collection of fields, such as transactional identifier field 580, randomized information field 582, unique identifier field 584, expiration field 586, subscriber information field 588, and attribute field 590.

Transactional identifier field 580 may store a transactional identifier associated with a request that is generated by CDS 230 based on randomized information stored in randomized information field 582 and a UIDH stored in unique identifier field 584. Randomized information field 582 may store randomized information that was used to generate the transactional identifier stored in transactional identifier field 580. Unique identifier field 584 may store the UIDH, corresponding to the transactional identifier stored in transactional identifier field 580, that may be generated by CDS 230 when processing a request received from a particular user device 210. Expiration field 586 may store information that identifies a time at which the UIDH expires. Subscriber information field 588 may store information associated with the subscriber (e.g., an identifier, such as a MDN, a LDN, a SIM URI, a MIN, an IMSI, a MSISDN, a NAI, etc.), obtained from the request, in a manner similar to that described above. Attribute field 590 may store one or more subscriber attributes (e.g., a geographical area, a gender, a preferred content genre, a language, a usage history, a purchase history, parental controls, etc.) of the subscriber. The subscriber attribute may, for example, be obtained by CDS 230 from a subscriber profile based on the information associated with the subscriber.

By way of example, CDS 230 may receive, from user device 210 and via PGW 220, a request, such as a request for content. CDS 230 may store, in data structure 575, a subscriber identifier associated with a subscriber (e.g., MDN1) using user device 210 and a UIDH (e.g., UIDH1) that is generated based on the subscriber identifier (e.g., as shown by ellipse 597). Additionally, or alternatively, CDS 230 may store a transactional identifier (e.g., TID1) generated based on the UIDH, along with randomized information used to generate the transactional identifier (e.g., VAL1, as shown by ellipse 597). Additionally, or alternatively, CDS 230 may store information that identifies a time when the UIDH expires (e.g., T1) and one or more attributes (e.g., A1) of the subscriber (e.g., as shown by ellipse 597). Additionally, or alternatively, CDS 230 may process other requests and may store other information that is generated as a result of processing the other requests (e.g., as shown by ellipse 598).

Fields 580-590 within data structure 575 are provided for explanatory purposes only. In practice, data structure 575 may include additional fields, fewer fields, different fields, and/or differently arranged fields than are described with respect to data structure 575.

Figure 6:
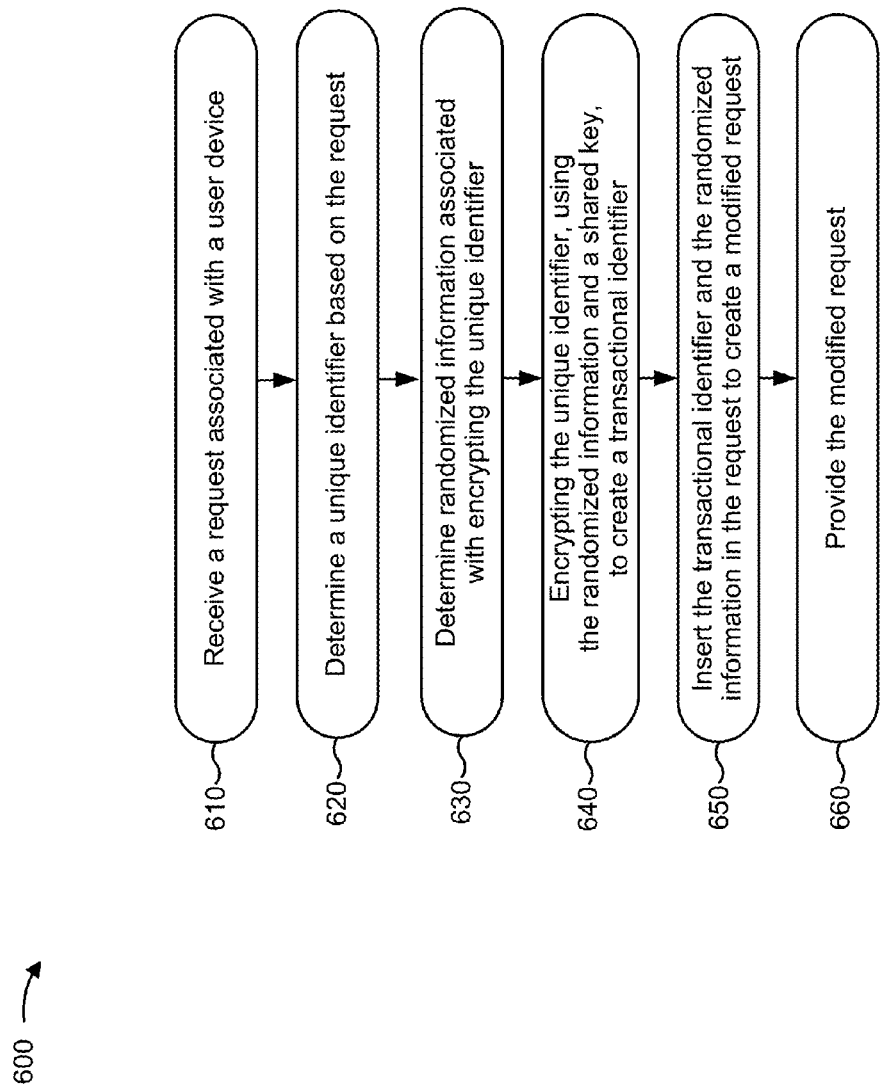
FIG. 6 is a flow chart of an example process for encrypting a unique identifier to create a transactional identifier for insertion in a request associated with a subscriber.

FIG. 6 is a flow chart of an example process 600 for encrypting a unique identifier to create a transactional identifier for insertion in a request associated with a subscriber. In some implementations, one or more process blocks of FIG. 6 may be performed by CMDS 310. In some implementations, one or more process blocks of FIG. 6 may be performed by another component or a group of components separate from or including CMDS 310, such as another component of CDS 230 and/or another device of environment 200.

As shown in FIG. 6, process 600 may include receiving a request associated with a user device (block 610). For example, CMDS 310 may receive a request associated with user device 210. In some implementations, CMDS 310 may receive the request when another device provides the request, such as user device 210 and/or PGW 220.

In some implementations, the request may include a request for content associated with content provider 250. For example, the request may include a request associated with content to be provided to user device 210 by content provider 250, such video, audio, an image, advertising content, a web page, text, data, content associated with an application hosted by content provider 250, content associated with a service provided by content provider 250, or the like.

In some implementations, the request may include information associated with user device 210 and/or a subscriber (e.g., a user) associated with user device 210. For example the request may include information that identifies user device 210, such as an IMEI, an ESN, a MEID, or the like. As another example, the request may include information that identifies the subscriber associated with user device 210, such as a MDN, a LDN, a SIM URI, a MIN, an IMSI, a MSISDN identifier, a NAI, or the like.

Additionally, or alternatively, the request may include information associated with a destination of the request. For example, the request may include a destination address, such as a URL, a destination IP address, or the like. As another example, the request may include information that identifies a content provider associated with the request, such as a content provider name, a content provider identification number, a web site name, or the like.

Additionally, or alternatively, the request may include another type of information, such as information that identifies a message type of the request (e.g., an HTTP GET request, an HTTP POST request, etc.), a user agent associated with user device 210, or the like.

In some implementations, CMDS 310 may receive the request and may determine, based on the request, whether CMDS 310 is to insert a transactional identifier in the request (i.e., whether to proceed with process 600). For example, CMDS 310 may store or have access to a "whitelist" that identifies content providers to which transactional identifiers are to be provided. Similarly, CMDS 310 may store or have access to a "blacklist" that identifies content providers to which transactional identifiers are not to be provided. In these examples, CMDS 310 may inspect the request (e.g., using a deep packet inspection (DPI) technique) in order to identify a content provider associated with the request. Here, based on identifying the content provider associated with the request, CMDS 310 may determine whether to proceed with process 600. If CMDS 310 determines that a transactional identifier is not to be provided to the content provider associated with the request, then CMDS 310 may provide the request without inserting a transactional identifier into the request (and without the subscriber identifier and/or information that identifies user device 210), thus saving processing resources of CMDS 310. Alternatively, if CMDS 310 determines that a transactional identifier is to be provided to the content provider associated with the request, then CMDS 310 may continue with process 600 as described below.

Notably, while implementations described herein may be described in the context of a request for content, in some implementations, the request may include another type of request, such as a request associated with identifying the subscriber associated with user device 210, a request associated with mobile commerce in which the subscriber wishes to participate, a request associated with a fraud prevention and/or protection service, or the like.

As further shown in FIG. 6, process 600 may include determining a unique identifier based on the request (block 620). For example, CMDS 310 may determine a UIDH based on the request. In some implementations, CMDS 310 may determine the UIDH after CMDS 310 receives the request. Additionally, or alternatively, CMDS 310 may determine the UIDH when CMDS 310 receives an indication to determine the UIDH from another component and/or device, such as another component of CDS 230 and/or another device of environment 200.

The UIDH may include an identifier that corresponds to the subscriber information included in the request. For example, the UIDH may be a unique identifier associated with the subscriber. In some implementations, the UIDH may be an encoded version of the subscriber information. For example, the UIDH may be an encoded version of and MDN associated with the subscriber. Additionally, or alternatively, the UIDH may be associated with a key, where the key may be valid for a particular period of time, such as one hour, 12 hours, one day, three days, seven days, or the like. In some implementations, the UIDH may expire when the key, with which the UIDH is associated, is no longer valid.

In some implementations, CMDS 310 may determine the UIDH based on generating the UIDH. For example, CMDS 310 may receive a key provided by key manager 320, and may generate the UIDH by encoding the subscriber information based on the key.

Additionally, or alternatively, CMDS 310 may determine the UIDH based on receiving the UIDH from another component of CDS 230. For example, CMDS 310 may request the UIDH from key manager 320. Key manager 320 may generate the UIDH, and may provide the UIDH to CMDS 310.

Additionally, or alternatively, CMDS 310 may determine the UIDH based on information stored or accessible by CMDS 310. For example, storage 340 may store or have access to a previously generated UIDH associated with the subscriber. Here, CDS 230 may retrieve the UIDH from storage 340. In some implementations, CMDS 310 may determine that the retrieved UIDH has not expired based on a key corresponding to the UIDH and stored by storage 340.

As further shown in FIG. 6, process 600 may include determining randomized information associated with encrypting the unique identifier (block 630). For example, CMDS 310 may determine randomized information associated with encrypting the UIDH. In some implementations, CMDS 310 may determine the randomized information when (e.g., before, after, concurrently with, etc.) CMDS 310 determines the UIDH. Additionally, or alternatively, CMDS 310 may determine the randomized information when CMDS 310 receives an indication that CMDS 310 is to determine the randomized information from another component and/or another device, such as another component of CDS 230 and/or another device of environment 200.

In some implementations, the randomized information may include a string of characters that may be used to encrypt the UIDH. For example, the randomized information may include a random string of alphanumeric characters, a random numerical value, a nonce, or the like. In some implementations, the randomized information may be used, in conjunction with a shared key, to encrypt the UIDH, as described below.

In some implementations, CMDS 310 may determine different randomized information for every request received in which a transactional identifier is to be inserted. For example, a first request, associated with a UIDH, and a second request, associated with the same UIDH, may be encrypted based on first randomized information and second (i.e., different) randomized information, respectively. Therefore, a first transactional identifier associated with the UIDH (e.g., created based on the first randomized information) and a second transactional identifier associated with the UIDH (e.g., created based on the second randomized information) may be different, as described in further detail below. In this way, a content provider may be prevented from identifying the subscriber and/or tracking subscriber activity based on the UIDH (e.g., since requests associated with the same UIDH may include different transactional identifiers), while still allowing targeted content to be provided to user device 210 associated with the subscriber, as described below.

In some implementations, CMDS 310 may determine the randomized information based on generating the randomized information. For example, CMDS 310 may be capable of generating a random 128 bit number, a random 64 bit number, or the like. Additionally, or alternatively, CMDS 310 may determine the randomized information based on information provided by another component and/or device. For example, CMDS 310 may send, to key manager 320, a request to provide the randomized information, and may determine the randomized information based on a response to the request when, for example, key manager 320 is capable of generating the randomized information.

As further shown in FIG. 6, process 600 may include encrypting the unique identifier, using the randomized information and a shared key, to create a transactional identifier (block 640). For example, CMDS 310 may encrypt the UIDH, using the randomized information and a shared key, to create a transactional identifier. In some implementations, CMDS 310 may encrypt the UIDH after CMDS 310 determines the randomized information. Additionally, or alternatively, CMDS 310 may encrypt the UIDH when CMDS 310 receives an indication that CMDS 310 is to encrypt the UIDH from another component and/or device, such as another component of CDS 230 and/or another device of environment 200.

In some implementations, CMDS 310 may encrypt the UIDH based on a shared key. The shared key may include a value, stored or accessible by both CMDS 310 and shared with content provider 250, that may be used to encrypt and/or decrypt a transactional identifier. For example, the shared key may include a random value, such as a 128 bit random number. As another example, the shared key may include a derived value, such as a value derived based on applying a cryptographic hash function (e.g., secure hash algorithm 1 (SHA1)), to a random number and/or another item of information, such as a calendar time (e.g., Unix ctime). In some implementations, the shared key may be generated using a non-deterministic function. In some implementations, the shared key may be determined using a deterministic function. In some implementations, CMDS 310 may generate the shared key. Additionally, or alternatively, another component and/or device may generate the shared key, such as key manager 320, and provide the shared key to CMDS 310.

In some implementations, CDS 230 may store the shared key. Additionally, the shared key may be stored or accessible by a device associated with an entity authorized to access the UIDH, such as ad provider 255 and/or ad exchange server 350. However, the shared key may not be shared with a device associated with an entity not authorized to access the UIDH, such as content provider 250. As such, the device associated with the authorized entity may be capable of decrypting the transactional identifier created based on the shared key, while the device associated with the unauthorized entity may be unable to decrypt the transactional identifier, as described below.

In some implementations, the shared key may be changed at particular intervals of time. For example, a same shared key may be used to encrypt UIDHs for a particular period of time, such as one month, six months, one year, or the like. Here, at each interval of time, a new shared key may be generated and shared with devices associated with authorized entities (e.g., such that the devices may be capable of decrypting transactional identifiers created based on the new shared key).

In some implementations, CMDS 310 may create the transactional identifier based on the shared key and the randomized information. For example, CMDS 310 may combine the UIDH and the randomized information by adding the randomized information at the end of the UIDH, the beginning of the UIDH, in the middle of the UIDH, by interleaving the randomized information with the UIDH, or the like. Here, CMDS 310 may encrypt the combined UIDH and randomized information using the shared key to create the transactional identifier. In other words, the transactional identifier may include a combination of the UIDH and the randomized information that has been encrypted based on the shared key. In some implementations, CMDS 310 may encrypt the combination of the UIDH and the randomized information using a block cipher, such as Advanced Encryption Standard (AES) 128, AES 192, AES 256, or the like.

In some implementations, CMDS 310 may encrypt a combination of the UIDH, the randomized information, and other information, such as a subscriber signal byte string associated with the subscriber. The subscriber signal byte string may include information that may be used to identify one or more characteristics and/or an attributes of the subscriber (e.g., without requiring a query against SPC 360). For example, the subscriber signal byte string may include information that identifies a subscriber status, such as suspended, not suspended, active, inactive, or the like. Here, the subscriber signal byte string may include a first alphanumeric value in a first byte (i.e., a first subscriber signal), where a particular value of the first byte may represent the subscriber status (e.g., 0=suspended, 1=not suspended, etc.).

As another example, the subscriber signal byte string may include information that identifies a length of time associated with the subscriber's subscription, such as a number of days associated with the subscription, a number of months associated with the subscription, a number of years associated with the subscription, or the like. Here the subscriber signal byte string may include an alphanumeric value included in a second byte of the subscriber signal byte (i.e., a second subscriber signal), where a particular value of the second byte may represent the information associated with the length of time (e.g., a value of 001 may indicate the subscriber has been an active customer for 1 month, etc.).

As yet another example, the subscriber signal byte string may include information that may be used to determine targeted content to be provided to the subscriber, such as information that identifies a gender of the subscriber, an age of the subscriber, a household income of the subscriber, other demographic information associated with the subscriber, or the like. Here the subscriber signal byte string may include an alphanumeric value included in another portion of the subscriber signal byte string (i.e., a third subscriber signal), where a particular value may represent the information associated with determining the targeted content (e.g., a value of HHI60 may indicate that household income of the subscriber is $60,000, etc.).

In some implementations, CMDS 310 may generate the subscriber signal byte string based on information stored or accessible another component of CDS 230, such as storage 340. In some implementations, the subscriber signal byte string may be used in associated with a request associated with a fraud prevention and/or protection service. For example, in response to receiving the subscriber signal byte string, a payment processor may prompt the subscriber with additional authentication challenge questions when the subscriber has recently activated user device 210, registers a payment method, and attempts to complete a mobile commerce transaction. In some implementations, the subscriber signal byte string may be combined with the UIDH and the randomized information, and the combination of the UIDH, the randomized information, and the subscriber signal byte string may be encrypted in the manner described above.

As further shown in FIG. 6, process 600 may include inserting the transactional identifier and the randomized information in the request to create a modified request (block 650). For example, CMDS 310 may insert the transactional identifier and the randomized information in the request to create a modified request. In some implementations, CMDS 310 may insert the transactional identifier and the randomized information in the request after CMDS 310 creates the transactional identifier. Additionally, or alternatively, CMDS 310 may insert the transactional identifier in the request after CMDS 310 receives an indication to insert the transactional identifier and the randomized information in the request from another component and/or device.

In some implementations, CMDS 310 may insert the transactional identifier and the randomized information as additional headers to create the modified request. For example, CMDS 310 may insert the transactional identifier and the randomized information in the request as shown above with regard to FIG. 5B. Additionally, or alternatively, CMDS 310 may insert the transactional identifier and the randomized information in the request in another manner to create the modified request.

As further shown in FIG. 6, process 600 may include providing the modified request (block 660). For example, CMDS 310 may provide the modified request. In some implementations, CMDS 310 may provide the modified request after CMDS 310 creates the modified request. Additionally, or alternatively, CMDS 310 may provide the modified request after CMDS 310 receives an indication that CMDS 310 is to provide the modified request.

In some implementations, CMDS 310 may provide the modified request based on information included in the modified request. For example, CMDS 310 may provide the modified request to content provider 250 based on a network address associated with content provider 250 included within the modified request.

In some implementations, CMDS 310 may repeat process 600 for multiple requests provided by user device 210 associated with the subscriber. For example, CMDS 310 may repeat process 600 for each HTTP request provided by user device 210. Here, CMDS 310 may generate a different transactional identifier for each request (e.g., since each transactional identifier is generated using a different random number), which may prevent content provider 250 from identifying the subscriber and/or tracking subscriber activity based on the UIDH.

In some implementations, content provider 250 may receive the modified request, and may provide the transactional identifier and the randomized information to a device associated with an authorized entity, such as ad provider 255 and/or ad exchange server 350. In this example, ad provider 255 and/or ad exchange server 350 may decrypt the transactional identifier based on the randomized information and the shared key (e.g., stored or accessible by ad provider 255 and/or ad exchange server 350 based on being shared by key manager 320). Ad provider 255 and/or ad exchange server 350 may then provide and/or identify targeted content to be provided to user device 210. As such, an identity of and/or activity related to the subscriber may be protected, while still allowing targeted content to be provided to user device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
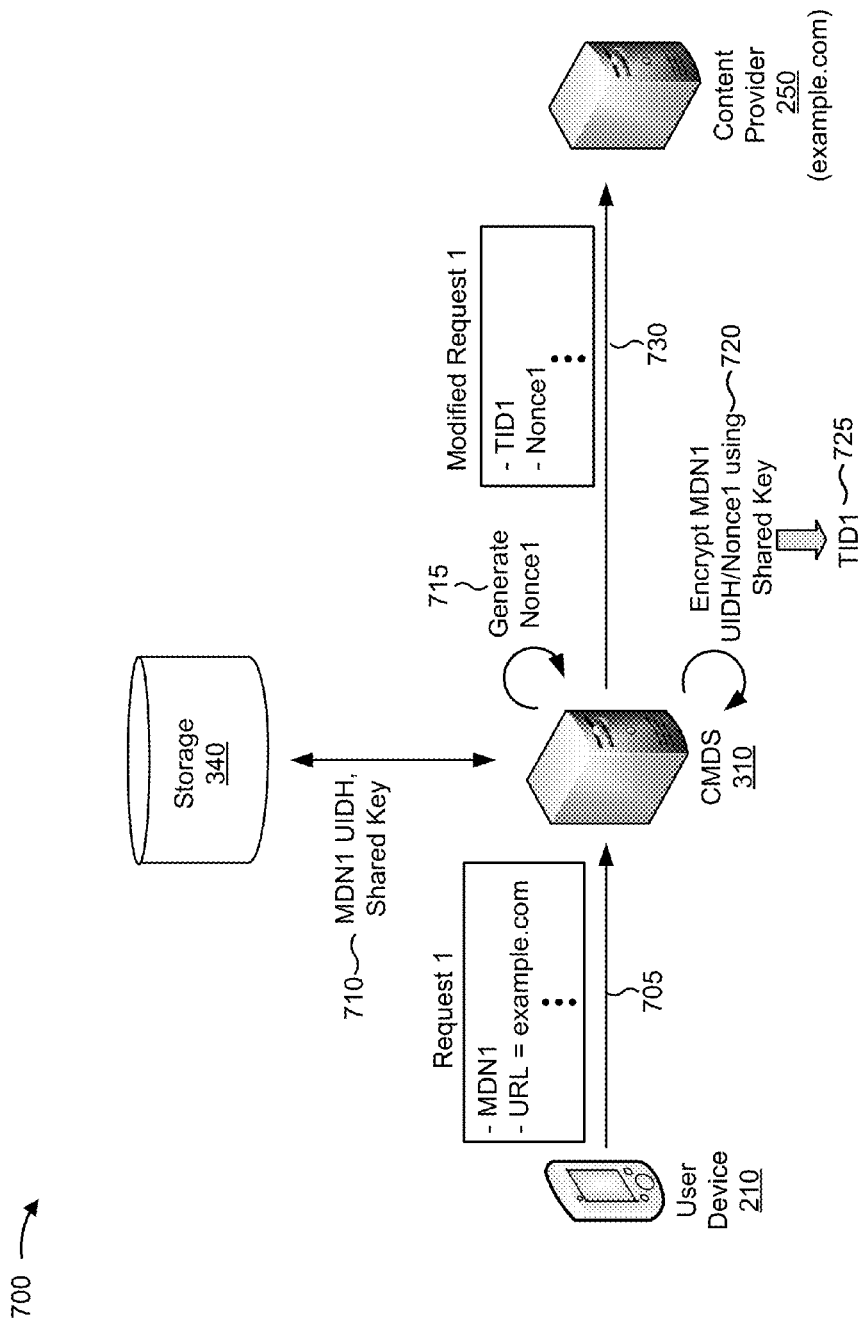
FIGS. 7A and 7B are diagrams of an example implementation relating to the example process shown in FIG. 6.
Figure 7B:
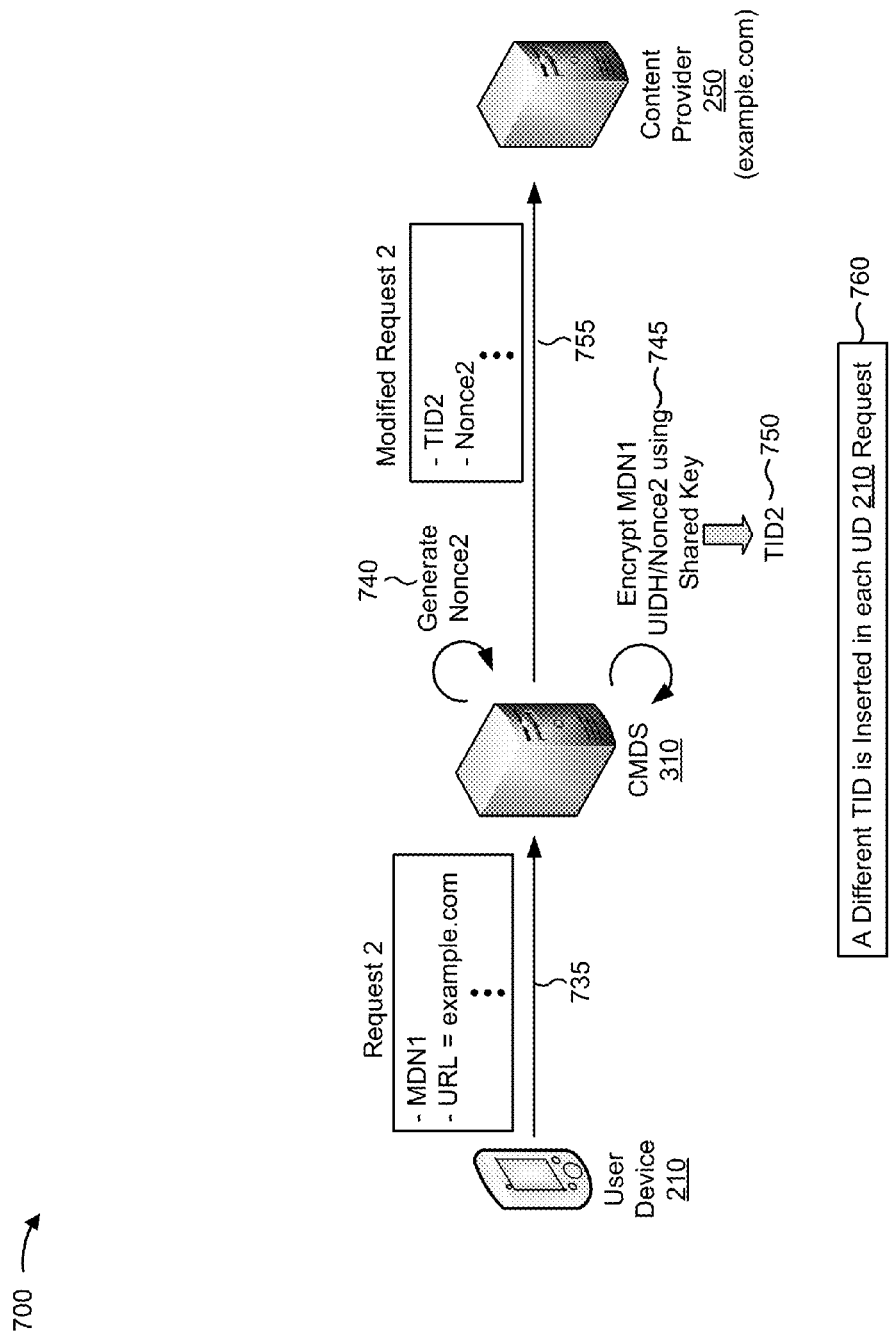

FIGS. 7A and 7B are diagrams of an example implementation 700 relating to example process 600 shown in FIG. 6. For the purposes of example implementation 700, assume that user device 210 receives (e.g., based on user input from a subscriber) an indication that user device 210 is to request content stored or accessible by content provider 250.

As shown in FIG. 7A, and by reference number 705, user device 210 may provide a first content request (e.g., request 1) to CMDS 310 positioned between user device 210 and content provider 250. As shown, the first content request may include a subscriber identifier associated with the subscriber (e.g., MDN1) and information associated with content provider 250 (e.g., URL=example.com). For the purposes of example implementation 700, assume that CMDS 310 is configured to insert a transactional identifier in each content request received by CMDS 310.

As shown by reference number 710, after receiving the first content request, CMDS 310 may retrieve, from storage 340, a subscriber UIDH associated with user device 210 (e.g., MDN1 UIDH) and a shared key with which the subscriber UIDH is to be encrypted to create a first transactional identifier associated with the first content request. As shown by reference number 715, CMDS 310 may also generate first randomized information associated with creating the first transactional identifier (e.g., nonce1). As shown by reference number 720, CMDS 310 may combine the subscriber UIDH and the first randomized information (e.g., by adding nonce1 to the end of MDN1 UDH), and may encrypt the combination using the shared key. As shown by reference number 725, the encrypted combination of the subscriber UIDH and the first randomized information may be the first transactional identifier (e.g., TID1). As shown by reference number 730, CMDS 310 may insert the first transactional identifier and the first randomized information in the first content request to create a first modified content request (e.g., modified request 1), and may provide the first modified content request to content provider 250.

In some implementations, content provider 250 may receive the first modified content request, and may provide the first transactional identifier and the first randomized information to a device associated with an entity that is authorized to access the subscriber UIDH, such as ad provider 255 and/or ad exchange server 350. In this example, ad provider 255 and/or ad exchange server 350 may decrypt the first transactional identifier based on the first randomized information and the shared key (e.g., stored or accessible by ad provider 255 and/or ad exchange server 350 based on being shared by key manager 320). Ad provider 255 and/or ad exchange server 350 may then provide and/or identify targeted content to be provided to user device 210 based on the UIDH determined based on decrypting the transactional identifier.

As shown in FIG. 7B, and by reference number 735, CMDS 310 may receive, at a later time, a second content request (e.g., request 2) provided by user device 210 and associated with content provider 250. For the purposes of FIG. 7B, assume that CMDS 310 stores or has access to the subscriber UIDH associated with user device 210 (e.g., MDN1) and the shared key, as described above with regard to FIG. 7A. As shown by reference number 740, CMDS 310 may generate second randomized information associated with encrypting the subscriber UIDH (e.g., nonce2). As shown by reference number 745, CMDS 310 may combine the subscriber UIDH and the second randomized information (e.g., by adding nonce2 to the end of MDN1 UDH), and may encrypt the combination using the shared key. As shown by reference number 750, the encrypted combination of the subscriber UIDH and the second randomized information may be a second transactional identifier (e.g., TID2) that differs from the first transactional identifier.

As shown by reference number 755, CMDS 310 may insert the second transactional identifier and the second randomized information in the second content request to create a second modified content request (e.g., modified request 2), and may provide the second modified content request to content provider 250. In some implementations, the second transactional identifier may be decrypted in a similar manner as described above. As noted by reference number 760, CMDS 310 may continue generating different transactional identifiers, associated with the subscriber UIDH, for additional content requests provided by user device 210.

In this way, CMDS 310 may create multiple, different transactional identifiers corresponding to multiple content requests associated with the subscriber associated with user device 210. Here, since content provider 250 may be unable to decrypt the transactional identifiers (e.g., since content provider 250 may not store or have access to the shared key), content provider 250 may be prevented from identifying the subscriber and/or tracking subscriber activity based on the subscriber UIDH.

As indicated above, FIGS. 7A and 7B are provided merely as an example. Other examples are possible and may differ from what was described with regard to FIGS. 7A and 7B.

Implementations described herein may allow a content distribution system to create multiple, different transactional identifiers based on encrypting a UIDH, associated with a subscriber, and insert the multiple transactional identifiers into multiple corresponding requests associated with a content provider. This may prevent the content provider from identifying the subscriber and/or tracking subscriber activity based on the UIDH, while still allowing targeted content to be provided to the user device associated with the subscriber.

The foregoing disclosure provides illustration and description, but is not intended to be exhaustive or to limit the implementations to the precise form disclosed. Modifications and variations are possible in light of the above disclosure or may be acquired from practice of the implementations. For example, while implementations describe herein are described in the context of encrypting the UIDH to create the transactional identifier, in some implementations, the transactional identifier may be created based on other information, such as the subscriber identifier (e.g., an MDN, a LDN, a SIM URI, a MIN, an IMSI, a MSISDN identifier, a NAI, etc.).

As an example, in some implementations, CMDS 310 may identify a request as a request associated with identifying the subscriber associated with user device 210, a request associated with mobile commerce in which the subscriber wishes to participate, a request associated with a fraud prevention and/or protection service, or the like. In this case, CMDS 310 may encrypt an MDN associated with the subscriber (rather than the UIDH) and randomized information to create a transactional identifier. When a device associated with an authorized entity receives a modified request including the transactional identifier (e.g., an encrypted combination of the MDN and the randomized information), the device may decrypt the transactional identifier (e.g., using a shared key) to determine the MDN. In some implementations, this may reduce a number of queries against SPC 360 since the device need not query SPC 360 to determine the MDN (e.g., where the device may need to query SPC 360 to determine the MDN when the device decrypts the transactional identifier and determines the UIDH).

As used herein, the term component is intended to be broadly construed as hardware, firmware, or a combination of hardware and software.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive a content request associated with a user device,
the content request including information that identifies a subscriber associated with the user device, and
the content request including information that identifies a content provider associated with the content request;
generate, based on receiving the content request, a unique identification header (UIDH) by encoding the information that identifies the subscriber;
determine randomized information associated with encrypting the UIDH,
the randomized information being unique to the content request;
encrypt the UIDH to create a transactional identifier,
the UIDH being encrypted using the randomized information and a shared key;
insert the transactional identifier and the randomized information in the content request to create a modified content request; and
provide the modified content request including the transactional identifier and the randomized information.

2. The system of claim 1, where the one or more devices are further to:
determine, based on the information that identifies the content provider associated with the content request, that the transactional identifier is to be inserted in the content request; and
where the one or more devices, when generating the UIDH, are to:
generate the UIDH based on determining that the transactional identifier is to be inserted in the content request.

3. The system of claim 1, where the one or more devices are further to:
determine that the UIDH is a valid UIDH before encrypting the UIDH to create the transactional identifier.

4. The system of claim 1, where the content request is a hypertext transfer protocol (HTTP) request.

5. The system of claim 1, where the one or more devices are further to:
combine the UIDH and the randomized information; and
where the one or more devices, when encrypting the UIDH to create the transactional identifier, are to:
encrypt the combination of the UIDH and the randomized information using the shared key,
the transactional identifier being a result of encrypting the combination of the UIDH and the randomized information using the shared key.

6. The system of claim 1, where the shared key includes a string of characters derived based on applying a cryptographic hash function to a random value.

7. The system of claim 1, where the content request is a first content request, the randomized information is first randomized information, the transactional identifier is a first transactional identifier, and the modified content request is a first modified content request,
where the one or more devices are further to:
receive a second content request associated with the user device,
the second content request including the information that identifies the subscriber associated with the user device;
determine second randomized information associated with encrypting the UIDH,
the second randomized information being different from the first randomized information;
encrypt the UIDH to create a second transactional identifier,
the UIDH being encrypted based on the second randomized information and the shared key, and
the second transactional identifier being different from the first transactional identifier;
insert the second transactional identifier and the second randomized information in the second content request to create a second modified content request; and
provide the second modified content request including the second transactional identifier and the second randomized information.

8. A non-transitory computer-readable medium storing instructions, the instructions comprising:
one or more instructions that, when executed by one or more processors, cause the one or more processors to:
receive a request associated with a user device,
the request including information associated with a subscriber associated with the user device, and
the request including information that identifies a destination associated with the request;
generate, based on receiving the request, an identifier, by encoding the information associated with the subscriber;
determine randomized information associated with encrypting the identifier,
the randomized information being unique to the request;
encrypt the identifier to create a transactional identifier,
the identifier being encrypted using the randomized information and a shared key;
insert the transactional identifier and the randomized information in the request to create a modified request; and
provide the modified request including the transactional identifier and the randomized information.

9. The non-transitory computer-readable medium of claim 8, where the one or more instructions, when executed by the one or more processors, further cause the one or more processors to:
determine, based on the information that identifies the destination associated with the request, that the transactional identifier is to be inserted in the request; and
where the one or more instructions, that cause the one or more processors to generate the identifier, cause the one or more processors to:
generate the identifier based on determining that the transactional identifier is to be inserted in the request.

10. The non-transitory computer-readable medium of claim 8, where the one or more instructions, when executed by the one or more processors, further cause the one or more processors to:
determine that the identifier is a valid identifier before encrypting the identifier to create the transactional identifier.

11. The non-transitory computer-readable medium of claim 8, where the identifier includes at least one of:
a unique identification header (UIDH);
a mobile directory number (MDN);
a landline director number (LDN);

a subscriber identity module (SIM) uniform resource identifier (URI);
a mobile identification number (MIN);
an international mobile subscriber identity (IMSI);
a mobile subscriber integrated services digital network (MSISDN) identifier; or
a national access identifier (NAI).

12. The non-transitory computer-readable medium of claim 8, where the one or more instructions, when executed by the one or more processors, further cause the one or more processors to:
combine the identifier and the randomized information; and
where the one or more instructions, that cause the one or more processors to encrypt the identifier to create the transactional identifier, cause the one or more processors to:
encrypt the combination of the identifier and the randomized information using the shared key,
the transactional identifier being a result of encrypting the combination of the identifier and the randomized information.

13. The non-transitory computer-readable medium of claim 8, where the shared key includes a string of characters derived based on applying a non-deterministic function to a value.

14. The non-transitory computer-readable medium of claim 8, where the request is a first request, the randomized information is first randomized information, the transactional identifier is a first transactional identifier, and the modified request is a first modified request,
where the one or more instructions, when executed by the one or more processors, further cause the one or more processors to:
receive a second request associated with the user device,
the second request including the information associated with the subscriber associated with the user device;
determine second randomized information associated with encrypting the identifier,
the second randomized information being different from the first randomized information;
encrypt the identifier to create a second transactional identifier,
the identifier being encrypted based on the second randomized information and the shared key, and
the second transactional identifier being different from the first transactional identifier;
insert the second transactional identifier and the second randomized information in the second request to create a second modified request; and
provide the second modified request including the second transactional identifier and the second randomized information.

15. A method, comprising:
obtaining, by one or more devices, a request associated with a user device,
the request including a subscriber identifier associated with the user device, and
the request including information that identifies a content provider associated with the request;
generating, by the one or more devices and based on obtaining the request, a unique identifier by encoding the subscriber identifier;
generating, by the one or more devices, a random value associated with encrypting the unique identifier,
the random value being unique to the request;
encrypting, by the one or more devices, the unique identifier to create a transactional identifier,
the unique identifier being encrypted using the random value and a shared key stored or accessible by the one or more devices;
inserting, by the one or more devices, the transactional identifier and the random value in the request to create a modified request; and
transmitting, by the one or more devices, the modified request including the transactional identifier and the random value.

16. The method of claim 15, further comprising:
determining, based on the information that identifies the content provider associated with the request, that the transactional identifier is to be inserted in the request; and
where generating the unique identifier comprises:
generating the unique identifier based on determining that the transactional identifier is to be inserted in the request.

17. The method of claim 15, further comprising:
combining the unique identifier and the random value; and
where encrypting the unique identifier to create the transactional identifier comprises:
encrypting the combination of the unique identifier and the random value using the shared key,
the transactional identifier being a result of encrypting the combination of the unique identifier and the random value using the shared key.

18. The method of claim 15, where the shared key is not stored or accessible by the content provider.

19. The method of claim 15, where the request is a first request, the random value is a first random value, the transactional identifier is a first transactional identifier, and the modified request is a first modified request,
where the method further comprises:
obtaining a second request associated with the user device,
the second request including the subscriber identifier associated with the user device;
generating a second random value associated with encrypting the unique identifier,
the second random value being different from the first random value;
encrypting the unique identifier to create a second transactional identifier,
the unique identifier being encrypted based on the second random value and the shared key, and
the second transactional identifier being different from the first transactional identifier;
inserting the second transactional identifier and the second random value in the second request to create a second modified request; and
transmitting the second modified request including the second transactional identifier and the second random value.

20. The method of claim 15, where the shared key is only valid for a predefined period of time.

* * * * *